UNITED STATES PATENT OFFICE.

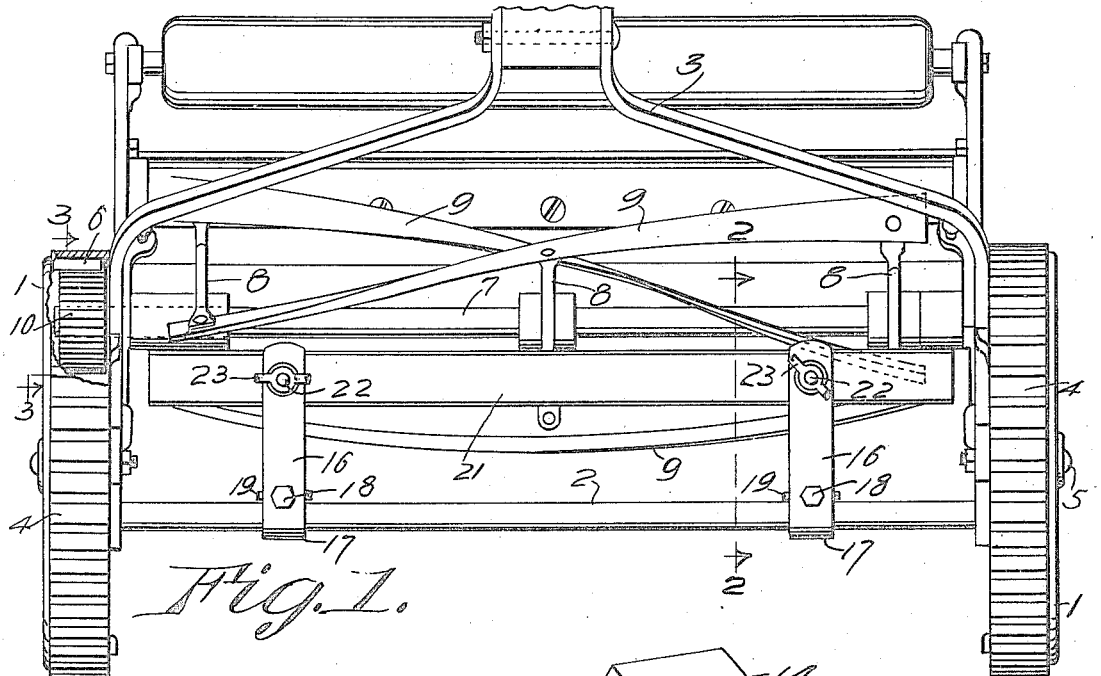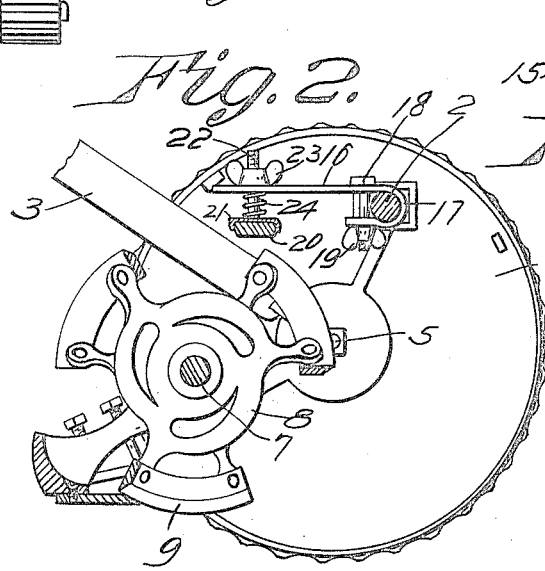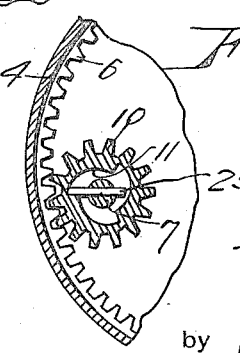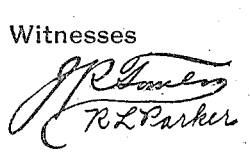

FRANK WALLACE LEIDECKER, OF MUSKOGEE, OKLAHOMA, ASSIGNOR TO LEIDECKER LAWN MOWER SHARPENING COMPANY, OF MUSKOGEE, OKLAHOMA, A CORPORATION OF OKLAHOMA.

SHARPENER.

1,206,554. Specification of Letters Patent. Patented Nov. 28, 1916.

Application filed March 30, 1916. Serial No. 87,815.

*To all whom it may concern:*

Be it known that I, FRANK WALLACE LEIDECKER, a citizen of the United States, residing at Muskogee, in the county of Muskogee and State of Oklahoma, have invented a new and useful Sharpener, of which the following is a specification.

The device forming the subject matter of this application is a sharpener adapted to be assembled with a lawn mower, for the purpose of grinding the rotary blades of the mower.

The invention aims to provide novel means for mounting the sharpener on the cross bar of the mower, to provide a novel process for sharpening a lawn mower, and to provide novel means whereby the process above mentioned may be carried out.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings, Figure 1 shows in elevation, a mower whereunto the device forming the subject matter of this application has been applied, a portion of the mower being broken away; Fig. 2 is a section on the line 2—2 Fig. 1; Fig. 3 is a section on the line 3—3 Fig. 1; Fig. 4 is a section on the line 3—3 of Fig. 1, showing the locking device mounted in place of the pawl; Fig. 5 is an elevation showing one end of the shaft; Fig. 6 is a perspective view showing the locking member; and Fig. 7 is a perspective view showing the pawl.

It is contemplated that the device forming the subject matter of this application shall be assembled with a lawn mower of standard and known construction. Such a lawn mower is depicted in the drawings, and since no novelty is claimed for many parts of the structure, the description will be shortened accordingly at the start, proper notice being given when the novel portions of the structure are reached In the accompanying drawings, there is is shown a lawn mower embodying side plates 1 connected by a cross bar 2 and pivotally united with a handle 3. Journaled for rotation on the side plates 1 are ground wheels 4 mounted on axles 5 carried by the side plates 1, the axles 5 frequently being bolts. The ground wheels 4 are equipped with internal gears 6. There is a shaft 7 journaled for rotation in the side plates 1, and it carries a cutter 8 embodying blades 9. The shaft 7 is mounted to rotate within pinions 10 provided with internal ratchets 11, the pinions 10 meshing into the internal gears 6 on the ground wheels 4. In the ends of the shaft 7, slots or guides 12 are formed. In the slots or guides 12 pawls 14 are mounted to reciprocate. The pawls 14 are removable and are provided with beveled ends 15. The pawls 14 coact with the ratchets 11 so that when the ground wheels 4 are rotated in one direction, the cutter blades 9 will be rotated also. When, however, the ground wheels 4 are rotated in an opposite direction, as takes place when the mower is drawn backwardly, then the cutter 8 is not rotated.

The foregoing embodies a standard and well known mower construction, for which no novelty is claimed, saving in so far as it may enter into combinations to be set forth hereinafter.

In carrying out the present invention, there is provided a pair of supports 16, equipped at their forward ends with hook-shaped heads 17 engaged around the cross bar 2. The body portions of the supports 16 are united with the ends of the hook-shaped heads 17 by means of bolts 18 carrying wing nuts 19.

The numeral 20 designates a sharpener which may be made of an emery compound, or be of any desired construction. The sharpener 20 is adapted to be slid edgewise into a trough-shaped holder 21 and to be held therein. Fixed to and upstanding from the holder 21 are threaded studs 22 passing loosely through the rear ends of the supports 16. Compression springs 24 are interposed between the supports 16 and the holder 21, and thus the sharpener 20 is forced downwardly, and is maintained yieldingly in such a position that when the cutter is rotated, the blades 9 of the cutter will coact with the sharpener 20, for the obvious purpose of grinding the blades. Threaded onto the upper ends of the studs 22 are wing nuts 23 coacting with the upper faces of the supports 16. When it is desired that the mowing operation shall be carried out without sharpening the blades 9, then the wing nuts 23 are rotated, to draw the sharpener 20 upwardly, out of contact with the blades 9.

In carrying out the sharpening process contemplated by the present application, one of the ground wheels 4 is removed. The pawl 14 which is individual to this ground wheel is removed, and in its place is mounted a locking member 25. Various procedures may be resorted to, in order to remove the pawl 14, this operation depending upon the particular construction of the mower. In one form of mower, the ground wheel 4 may be removed from the axle 5, the pinion 10 being detached from the shaft 7, and the pawl 14 being slid endwise out of the slot or guide 12, after which the key 25 is placed in the slot 12 and the pinion 10 is replaced on the shaft 7 and finally, the wheel 4 is mounted in place on the axle 5. The locking member 25 is long enough, as shown in Fig. 4, so as to coact with the internal ratchet 11 in such a way that the ratchet and the pinion 10 of which the ratchet 11 constitutes a part, will be connected with the cutter shaft 7 for rotation in opposite directions, it being impossible to rotate the pinion 10 without rotating the shaft 7 also. If, now, the lawn mower be reciprocated, one of the ground wheels 4, being rotated in reverse directions, will impart reverse rotations to the pinion 10, to the shaft 7 and to the cutter 8, the blades 9 of the cutter coming into contact with the sharpener 20, whether the cutter 8 is rotated in a clockwise direction or in a counter-clockwise direction.

Having thus described the invention, what is claimed is:—

A lawn mower including a ground-wheel; a rotary cutter; a means for connecting the ground-wheel with the cutter to rotate the cutter in one direction only, said means including a removable pawl; a sharpener coacting with the cutter; and a locking member interchangeable with the pawl.

In testimony that I claim the foregoing as my own, I have hereto affixed my signature in the presence of two witnesses.

FRANK WALLACE LEIDECKER.

Witnesses:
ELMER W. BRIDGMAN,
EDWARD CURD, Jr.